United States Patent
Hansen et al.

(10) Patent No.: US 9,406,176 B2
(45) Date of Patent: Aug. 2, 2016

(54) MANAGING SHORT-RANGE WIRELESS DEVICE CONNECTION PREFERENCES AT A VEHICLE

(71) Applicant: GM Global Technology Operations LLC, Detroit, MI (US)

(72) Inventors: Cody R. Hansen, Shelby Township, MI (US); Matthew M. Highstrom, South Lyon, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 205 days.

(21) Appl. No.: 14/107,018

(22) Filed: Dec. 16, 2013

(65) Prior Publication Data

US 2015/0170427 A1 Jun. 18, 2015

(51) Int. Cl.
G01M 17/00 (2006.01)
G06F 7/00 (2006.01)
G06F 19/00 (2011.01)
G07C 5/00 (2006.01)
H04W 4/00 (2009.01)
H04W 4/06 (2009.01)
H04W 48/10 (2009.01)

(52) U.S. Cl.
CPC .............. G07C 5/008 (2013.01); H04W 4/008 (2013.01); G07C 2205/02 (2013.01); H04W 4/06 (2013.01); H04W 48/10 (2013.01)

(58) Field of Classification Search
CPC .... G07C 5/008; H04W 4/008; H04W 76/025; H04W 4/06; H04W 12/06; H04W 12/08; H04W 48/10; H04W 76/02; G08B 25/10
USPC .......... 701/31.5, 36, 37; 455/41.1, 41.2, 41.3, 455/410, 418, 411, 437, 441, 440, 550.1; 370/338, 255
See application file for complete search history.

(56) References Cited

U.S. PATENT DOCUMENTS

| | | | | |
|---|---|---|---|---|
| 6,510,381 B2* | 1/2003 | Grounds | ............... | G01S 5/0027 307/10.1 |
| 6,876,642 B1* | 4/2005 | Adams | .................. | H04W 84/12 307/10.1 |
| 7,447,480 B2* | 11/2008 | Rieder | ................. | G07B 15/063 340/905 |
| 8,271,662 B1* | 9/2012 | Gossweiler, III | ... | H04M 1/6066 709/227 |
| 8,750,832 B2 | 6/2014 | Wuergler et al. | | |
| 2004/0219954 A1* | 11/2004 | Odinak | ............... | H04M 1/6075 455/569.1 |
| 2011/0112969 A1* | 5/2011 | Zaid | ........................ | G06Q 10/02 705/50 |
| 2011/0301839 A1* | 12/2011 | Pudar | ..................... | H04W 4/046 701/408 |
| 2012/0105346 A1* | 5/2012 | Chen | ................... | G06F 3/04883 345/173 |
| 2012/0244883 A1* | 9/2012 | Tibbitts | ................. | H04W 48/04 455/456.2 |
| 2012/0275392 A1* | 11/2012 | Haddad | ............... | H04W 84/005 370/329 |
| 2014/0031010 A1* | 1/2014 | Wuergler | ............... | H04W 4/046 455/411 |
| 2014/0187200 A1* | 7/2014 | Reitter | .................. | H04W 4/021 455/410 |
| 2014/0273955 A1* | 9/2014 | Oesterling | .......... | H04L 63/0853 455/411 |

* cited by examiner

*Primary Examiner* — Jason Holloway
*Assistant Examiner* — Rachid Bendidi
(74) *Attorney, Agent, or Firm* — Christopher DeVries; Reising Ethington P.C.

(57) ABSTRACT

A method of managing wireless devices at a vehicle includes detecting a plurality of wireless devices at the vehicle using a short-range wireless communication protocol; determining that one of the plurality of wireless devices belongs to a preferred group of wireless devices; and creating a short-range wireless link between the wireless device belonging to the preferred group and a vehicle telematics unit.

15 Claims, 2 Drawing Sheets

MANAGING SHORT-RANGE WIRELESS DEVICE CONNECTION PREFERENCES AT A VEHICLE

TECHNICAL FIELD

The present invention relates to wireless communications and more particularly to short-range wireless connections between a wireless device and a vehicle.

BACKGROUND

Vehicles are frequently equipped with vehicle telematics units capable of wireless communication. The vehicle telematics units can communicate with wireless carrier systems using cellular protocols and also communicate with local wireless devices using short-range wireless protocols. When a vehicle occupant enters a vehicle, the occupant is increasingly likely to be carrying a wireless device, such as a smart phone. The vehicle telematics unit can establish a short-range wireless connection with the smart phone, which can take advantage of features available at the vehicle, such as hands-free calling. But vehicles can carry not only the driver but also one or more passengers who may also use wireless devices, such as smart phones. When the driver arrives at the vehicle along with a passenger, the vehicle telematics unit may want to determine which of multiple devices the vehicle telematics unit should connect with.

SUMMARY

According to an aspect of the disclosure, there is provided a method of managing wireless devices at a vehicle. The method includes detecting a plurality of wireless devices at the vehicle using a short-range wireless communication protocol or a wired connection; determining that one of the plurality of wireless devices belongs to a preferred group of wireless devices; and creating a communication link between the wireless device belonging to the preferred group and a vehicle telematics unit.

According to another aspect of the disclosure, there is provided a method of managing wireless devices at a vehicle. The method includes detecting a plurality of wireless devices at the vehicle using a short-range wireless communication protocol; presenting an identity for each detected wireless device on a visual display in the vehicle; receiving a selection from a vehicle occupant that places one or more of the presented identities in a preferred group; and creating a short-range wireless link with a wireless device from the preferred group.

According to yet another aspect of the disclosure, there is provided a method of managing wireless devices at a vehicle. The method includes detecting a plurality of wireless devices at the vehicle using a short-range wireless communication protocol; determining whether one or more of the detected wireless devices are associated with a preferred group; if so, establishing a short-range wireless connection between the wireless device belonging to the preferred group and a vehicle telematics unit to the exclusion of wireless devices not associated with the preferred group; and if not, establishing a short-range wireless connection between a detected wireless device not associated with the preferred group.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENTS

The system and method described below manages short-range wireless connections between a vehicle and wireless devices in and around the vehicle. Vehicles can often only wirelessly connect with a finite number of wireless devices at any one time. If more than this finite number of wireless devices are present, then a determination can be made regarding which devices will be connected. When a vehicle owner is the only person who drives the vehicle, it may not be particularly important to identify one wireless device in the vehicle from another. However, when the vehicle owner or driver occupies the vehicle with passengers it can be helpful to differentiate wireless devices carried by the owner/driver using a preferred group. Short-range wireless connections between vehicle telematics units and wireless devices in the preferred group can then be favored over wireless devices not in the preferred group. It is also possible to permit vehicle owners or vehicle occupants to further define preferences for each wireless device within the preferred group. Beyond the preferences established by vehicle owners and occupants, the vehicle telematics unit can also monitor use variables, such as the frequency and duration for each wireless device it links with, and make decisions regarding priority within the preferred group based on the monitored variables.

Figure 1:
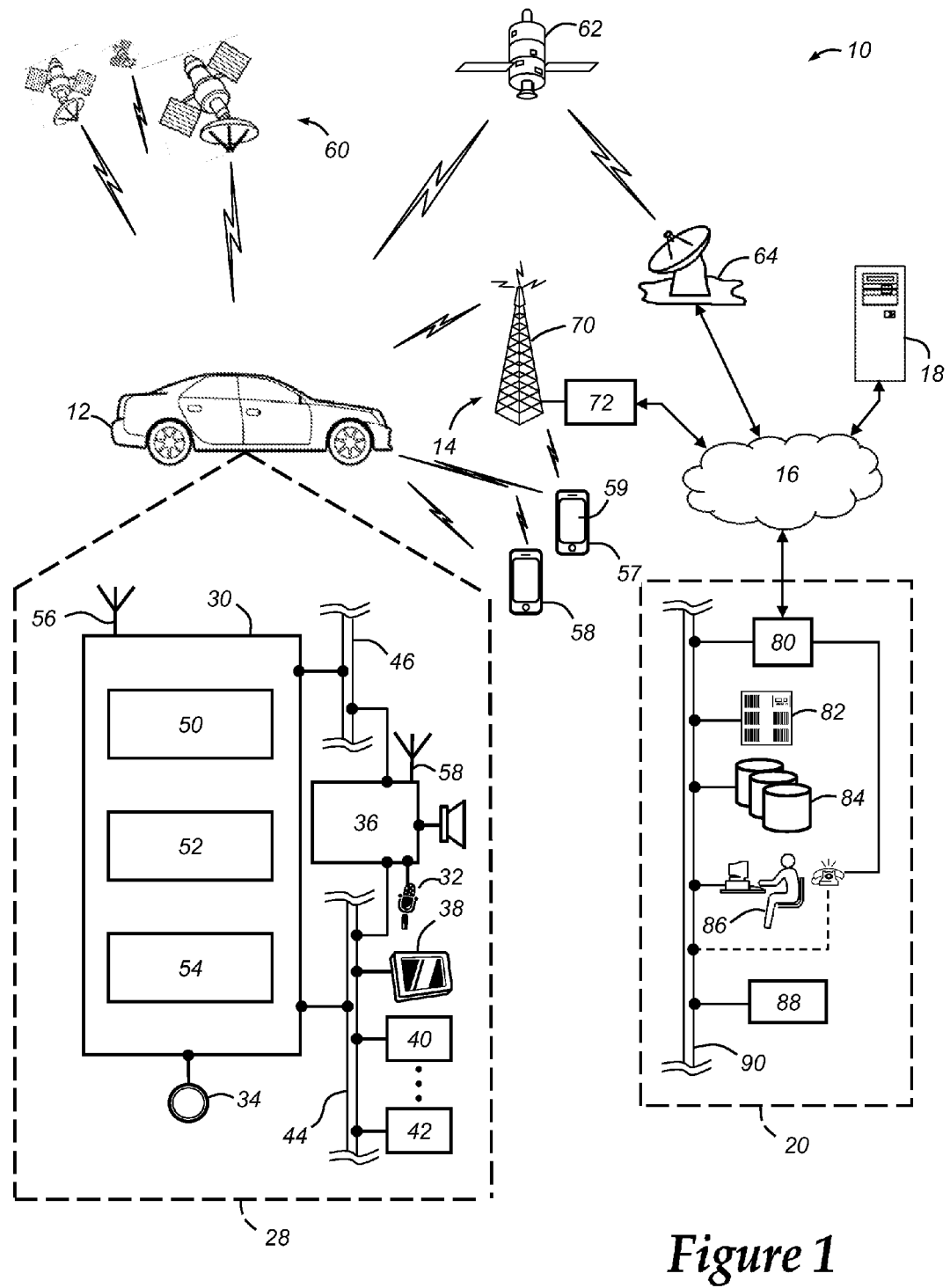
FIG. 1 is a block diagram depicting an embodiment of a communications system that is capable of utilizing the method disclosed herein.

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

One of the networked devices that can communicate with the telematics unit 30 is a wireless device, such as a smart phone 57. The smart phone 57 can include computer processing capability, a transceiver capable of communicating using a short-range wireless protocol via an antenna, and a visual smart phone display 59. In some implementations, the smart phone display 59 also includes a touch-screen graphical user interface and/or a GPS module capable of receiving GPS satellite signals and generating GPS coordinates based on those signals. Examples of the smart phone 57 include the iPhone™ manufactured by Apple, Inc. and the Droid™ manufactured by Motorola, Inc. These and other similar devices may be used or considered as a type of separate wireless device for the purposes of the method described herein. Another smart phone 58 having the same capabilities as smart phone 57 is also shown to indicate that the vehicle telematics unit 30 may detect more than one wireless device at the vehicle 12. While the smart phone 57 is described with the method below, it should be appreciated that other similar and/or simpler wireless devices can be successfully substituted for the smart phone 57 to carry out the method/system described herein. These simpler wireless devices can lack the ability to carry out cellular communications but still be able to communicate via short-range wireless communication protocols. Examples of these devices include an iPod Touch™ or an iPad™ each manufactured by Apple, Inc.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
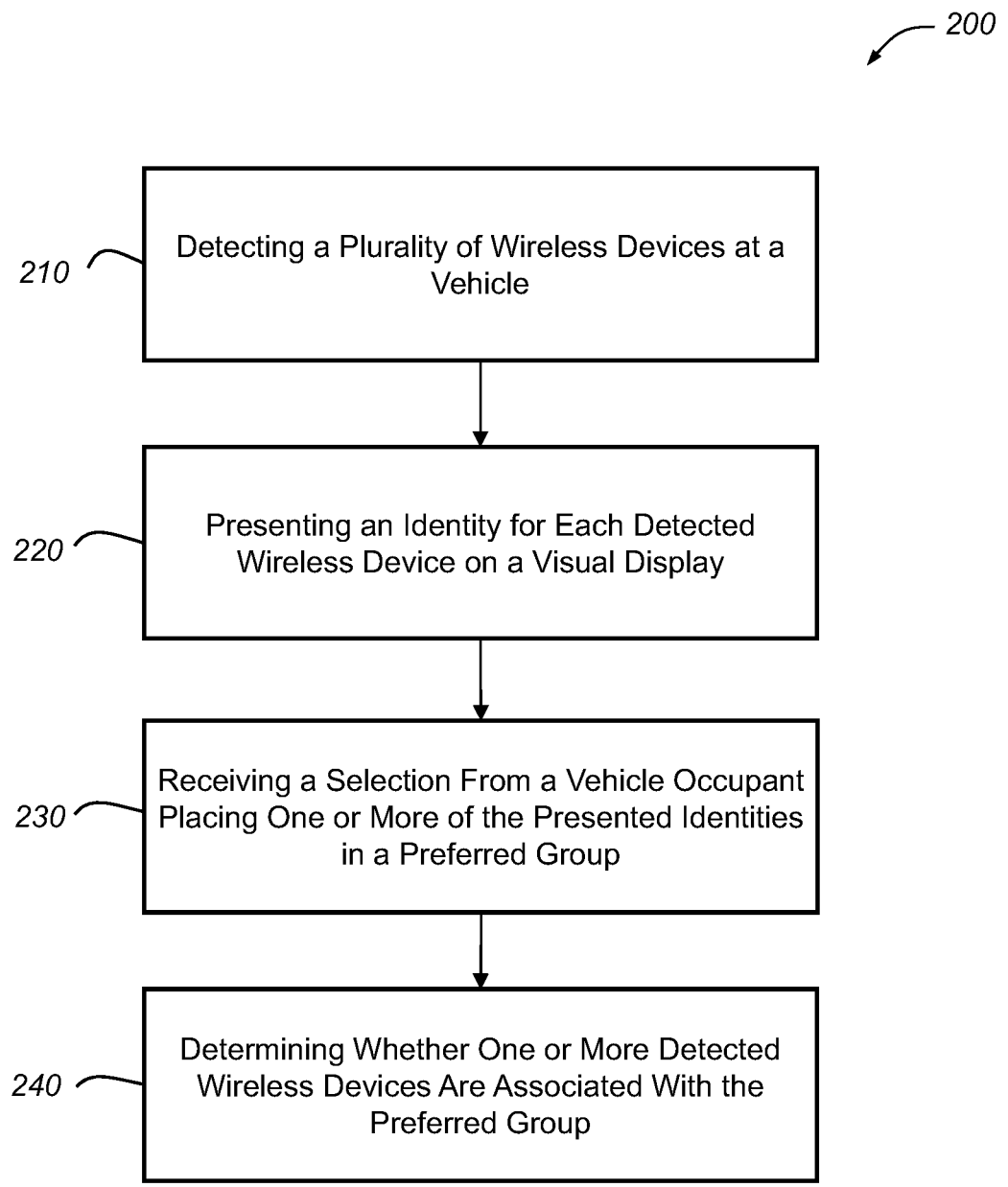
FIG. 2 is a flow chart of an embodiment of a method of managing wireless devices at a vehicle.

Turning now to FIG. 2, there is a method 200 of managing wireless devices at the vehicle 12. The method 200 begins at step 210 by detecting a plurality of wireless devices at the vehicle 12 and establishing a communication link with those devices. The vehicle 12 can detect the presence of two or more wireless devices by using a short-range wireless communication protocol or by detecting that the wireless devices have been linked to the vehicle 12 via a wired connection. Similarly, the communication link can be either via the wired connection or the short-range wireless link. When a vehicle occupant brings a wireless device, such as the smart phone 57, into the vehicle 12, the vehicle telematics unit 30 can detect the presence of the wireless device and establish a short-range wireless link with the device. While a wide variety of wireless devices can be used, the method 200 will be described as it can be carried out with the smart phone 57 and the smart phone 58. When the smart phone 57 and/or the smart phone 58 is located within a range of the vehicle 12 that can be defined by a boundary within which the vehicle telematics unit 30 can successfully carry out short-range wireless communications, a procedure for establishing a short-range wireless link begins. For instance, when using the Bluetooth short-range wireless protocol, the smart phone 57 and/or the smart phone 58 can be in a discoverable mode during which time it broadcasts information such as a name, identity, a device class, and/or technical features of the smart phone 57 and/or the smart phone 58. The vehicle telematics unit 30 can receive the broadcast information via the antenna 34 and use it to pair the smart phone 57 and/or the smart phone 58 with the vehicle telematics unit 30. This process can occur when initially pairing smart phone 57 with the vehicle telematics unit 30. However, if the vehicle telematics unit 30 has previously been paired with the smart phone 57 and/or the smart phone 58, the unit 30 may have stored at least some of the broadcast information such that the unit 30 can recognize the smart phone 57 and/or the smart phone 58 once they are within the boundary within which short-range communication is possible.

In another implementation, the vehicle telematics unit 30 can detect the creation or existence of wired communication links between itself and the smart phone 57 along with the smart phone 58. The wired communication links can be created when a wire is communicatively linked between the data output port of the smart phone 57/smart phone 58 and the vehicle telematics unit 30. It is possible that each of the smart phone 57 and the smart phone 58 can be connected to the vehicle telematics unit 30, such as by using USB ports located within the vehicle 12. Even though the vehicle 12 may provide two or more USB ports or other ports for wired communication with wireless devices, the vehicle telematics unit 30 may only be able to communicate with one of the wireless devices at a time despite having wired connections to both devices. For example, using the wired communication links, the vehicle telematics unit 30 can permit control of the smart phone 57 or the smart phone 58 via the visual display 38. Specifically, the images and content shown on the smart phone 57 or the smart phone 58 can be shown on the visual display 38, which can accept inputs that can control the smart phone 57 or the smart phone 58 like a user would with the smart phone display 59. Various protocols can be used to establish the wired communication link between the vehicle telematics unit 30 and the smart phone 57 or smart phone 58, such as the Apple Digital iPod Out or MirrorLink.

The identity of smart phone 57 (and smart phone 58) can be saved at the vehicle 12 in a most-recently attached list that may used to monitor the identity of wireless devices paired or connected with the vehicle telematics unit. Beyond monitoring whether or not a particular smart phone 57 or wireless device has been paired or connected with the vehicle telematics unit 30, the most-recently attached list can also monitor use variables, such as the number of times the smart phone 57 has been paired or connected with the vehicle telematics unit 30 and how much time has passed since the smart phone 57 was last paired or connected. The short-range wireless communications have been described with regard to Bluetooth protocols, but other short-range wireless protocols are possible as well. For instance, the method 200 can also be implemented using any of the IEEE 802.11 protocols that are commonly referred to as "Wi-Fi." The method 200 proceeds to step 220.

At step 220, an identity is presented for each detected wireless device on the visual display 38. The vehicle telematics unit 30 can either receive the name of the wireless devices (e.g., smart phones 57 and 58) or retrieve the name of these devices from the most-recently attached list. When the smart phones 57 and 58 are determined to be ready and capable of pairing or connecting in a way that establishes a short-range wireless link with the vehicle telematics unit 30, the names of the smart phones 57 and 58 can be shown on the visual display 38 in the vehicle 12. Before the short-range wireless link may be established with the vehicle telematics unit 30, it is possible to identify the smart phones 57 and 58 to the vehicle occupant. The method 200 proceeds to step 230.

At step 230, a selection is received from a vehicle owner or vehicle occupant that places one or more of the presented identities in a preferred group. Once the identities of the smart phones 57 and 58 are received and presented on the visual display 38, the vehicle occupant can prioritize at least one wireless device by selecting it for inclusion in the preferred group. The vehicle telematics unit 30 can save the identity of the selected smart phone 57 or smart phone 58 at the vehicle 12 for future reference. For example, when the identities of the smart phone 57 and smart phone 58 are shown on the display 38, the vehicle occupant can be prompted to select at least one of the wireless devices for inclusion with the preferred group. Selections can be made when the vehicle occupant applies pressure to the visual display 38 with his or her finger to select an icon associated with the smart phone 57 and/or smart phone 58. Beyond the selection of icons via finger actuation (e.g., a touchscreen), other mechanisms can also be used to select wireless devices, such as a rotary controller or the smart phone display 59. In some implementations it may be possible for the call center 20 to remotely select wireless devices for inclusion in the preferred group. The icon could be an outline of a star displayed next to the identity of the wireless device that becomes colored when the vehicle occupant selects the wireless device for inclusion in the preferred group. When one wireless device is selected for inclusion in the preferred group whereas another wireless device is not, the vehicle telematics unit 30 can attempt to establish a short-range wireless communications link or communications over the wired link with the device(s) in the preferred group before attempting links with wireless devices not in the preferred group. For example, the vehicle occupant can select the smart phone 57 for inclusion in the preferred group while not selecting smart phone 58. However, it is possible that both smart phone 57 and smart phone 58 can be included in the preferred groups.

The vehicle telematics unit 30 can offer further prioritization ranking options to the vehicle occupant. For instance, the vehicle telematics unit 30 can present to the vehicle occupant a list of each wireless device included in the preferred group and offer the vehicle occupant the opportunity to designate one wireless device in the preferred group to take priority over another wireless device on the list. For example, when the vehicle occupant is presented the identities of both smart phone 57 and smart phone 58 on the display 38, the vehicle occupant can be prompted to further prioritize these wireless devices within the preferred group. In one example, the smart phone 57 can be designated to be more preferred relative to the smart phone 58. So, when both smart phone 57 and smart phone 58 are detected to be present in the vehicle 12, the vehicle telematics unit 30 can determine that both the smart phone 57 and the smart phone 58 are included on the preferred list. However, the vehicle telematics unit 30 can then determine that the smart phone 57 is more preferred relative to the smart phone 58. And user-selected priority within the preferred group can be applied to situations when more than the finite number of wireless devices the vehicle telematics unit 30 is capable of communicating with are present. For example, if the vehicle telematics unit 30 detects four wireless devices, it can prompt the user to rank the four wireless devices within the preferred group. In addition, the user can opt not to attribute additional priority to wireless devices within the preferred group. In that case, when the vehicle telematics unit 30 detects more than one wireless device found within the preferred group, it could be equally likely that the unit 30 will register with either wireless device. Or, the method 200 can also maintain a list of wireless devices that were most-recently linked with the vehicle telematics unit 30. When the detected wireless devices are both found in the preferred list, the devices can be compared with devices most-recently linked with the vehicle telematics unit 30 and if one has linked more recently and/or more frequently than the other, the vehicle telematics unit 30 can select the more recent and/or more frequent device.

Still other preference rankings are possible. For example, when shown the identities of wireless devices on the display 38, the user can be prompted to prioritize the preference of wireless devices within the preferred group according to short-range wireless connection protocol. The display 38 can provide a plurality of short-range wireless communication protocols and ask the vehicle occupant to rank the protocols in order of preference. In one implementation, the display 38 can display "Bluetooth" and "Wi-Fi" and ask the user to rank the priority of each short-range wireless communication protocols. With this rank, the vehicle telematics unit 30 can first attempt to establish short-range wireless communications with one of these protocols before the other. In another implementation, the user can rank priorities between short-range wireless connections and wired connections. The method 200 proceeds to step 240.

At step 240, it is determined whether one or more of the detected wireless devices are associated with the preferred group. After the vehicle occupant has selected one or more wireless devices, such as smart phone 57, to be included in the preferred group, the vehicle telematics unit 30 can then detect the wireless devices present and then determine which (if any) of the wireless devices present are included or associated with the preferred group. Using the identities of the plurality of wireless devices, the vehicle telematics unit 30 can determine whether or not one or more of the devices belong to the preferred group. If so, then the vehicle telematics unit 30 can establish a short-range wireless connection or begin communications over the wired communication link with the wireless device belonging to the preferred group to the exclusion of wireless devices not associated with the preferred group. In another implementation, the vehicle telematics unit 30 can detect fewer wireless devices than available paths to communicate with those devices and attempt communications in order of whether or not the wireless device is in the preferred group. For example, if the vehicle telematics unit 30 detects the presence of both the smart phone 57 and the smart phone 59 and the unit 30 has the ability to communicate with three wireless devices at once, the unit 30 can attempt to determine if either of the smart phone 57 or the smart phone 59 is associated with the preferred group. If one of the smart phone 57 or smart phone 59 is associated with the preferred group, then the vehicle telematics unit 30 can attempt communications with that wireless device first. If none of the identities of the detected wireless devices belong to the preferred group, then the vehicle telematics unit can establish a short-range wireless connection or wired communication link with a detected wireless device not associated with the preferred group.

For instance, after an ignition cycle the vehicle telematics unit 30 may begin searching for wireless devices using short-range wireless protocols or detecting the presence of a wired communication link. This search may identify a plurality of wireless devices, like the smart phone 57 and the smart phone 58. If the smart phone 57 has been previously associated with a preferred group while the smart phone 58 has not, then the vehicle telematics unit 30 can make this determination. The vehicle telematics unit 30 can receive the identities of the smart phone 57 and the smart phone 58 as part of detecting their presence. Using the received identities, the vehicle telematics unit 30 can compare them with a list of wireless devices that have been associated with a preferred group. Using this example, the vehicle telematics unit 30 can determine that the smart phone 57 is associated with the preferred group while the smart phone 58 is not. The vehicle telematics unit 30 can then decide to establish a short-range wireless link or begin communicating over wired link with the smart phone 57.

One example of how method 200 can be carried out may be described with respect to a married couple who shares the vehicle 12. The couple can be a wife who carries the smart phone 57 and a husband who carries the smart phone 58. And the wife may use the vehicle 12 during the day for commuting to work. However, the husband and wife may ride together to visit a restaurant in the evening. The couple may follow a routine in which the wife drives alone when commuting but rides as a passenger when both husband and wife drive to the restaurant. So when driving together the couple may wish for the vehicle telematics unit 30 to establish the short-range wireless communication link with smart phone 58 of the husband rather than smart phone 57 of the wife. In that case, the vehicle telematics unit 30 can detect an initial presence of smart phone 58 and prompt the vehicle occupant with the option to associate smart phone 58 with the preferred group via display 38. Once the husband associates the smart phone 58 with the preferred group, the vehicle telematics unit 30 can choose to establish a short-range wireless connection with smart phone 58 rather than smart phone 57. That is, when the wife commutes alone with the vehicle 12, the vehicle telematics unit 30 can initially search for wireless devices associated with a preferred group and find none. The vehicle telematics unit 30 can detect the presence of smart phone 57 and decide to establish a short-range wireless link with it. Later, when the couple ride in the vehicle 12 together along with the smart phone 57 and the smart phone 58, the vehicle telematics unit 30 can determine whether any of the detected wireless devices are associated or belong to the preferred group. When driving to dinner, the vehicle telematics unit 30 can detect both the smart phone 57 and the smart phone 58. However, when comparing the identities of the smart phone 57 and the smart phone 58 with identities of wireless devices stored with the preferred group, the unit 30 will find only the smart phone 58 in that group. After finding the smart phone 58 in the preferred group without also detecting smart phone 57, the vehicle telematics unit 30 can decide to establish a short-range wireless link with smart phone 58. The method 200 then ends.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of managing handheld wireless devices at a vehicle, comprising the steps of:
   (a) receiving, at the vehicle, information broadcasted from a handheld wireless device during a wireless device discoverable mode;
   (b) storing, at the vehicle, at least some of the information broadcasted from the handheld wireless device, the stored information including an identity of the handheld wireless device;
   (c) associating the identity of the handheld wireless device with a preferred group of wireless devices;
   (d) detecting a plurality of handheld wireless devices at the vehicle using a short-range wireless communication protocol or a wired connection;
   (e) determining whether one of the plurality of handheld wireless devices detected in step (d) belongs to the preferred group of wireless devices; and
   (f) when one of the plurality of handheld wireless devices detected in step (d) is determined to belong to the preferred group of wireless devices in step (e), creating a communication link between the handheld wireless device belonging to the preferred group and a vehicle telematics unit.

2. The method of claim 1, further comprising the step of saving, at the vehicle, identities of the plurality of handheld wireless devices detected in step (d) in a most-recently attached list, wherein the identity of the handheld wireless device includes a name of the handheld wireless device, and the vehicle telematics unit can either receive a name of at least one of the wireless devices detected in step (d) from the preferred group of wireless devices or retrieve a name of at least one of the wireless devices detected in step (d) from the most-recently attached list.

3. The method of claim 1, wherein step (e) includes determining whether two or more of the plurality of handheld wireless devices detected in step (d) belong to the preferred group of wireless devices, and when two or more of the plurality of handheld wireless devices detected in step (d) are determined to belong to the preferred group of wireless devices in step (e), step (f) includes creating a communication link between only one of the handheld wireless devices belonging to the preferred group and the vehicle telematics unit.

4. The method of claim 1, further comprising the steps of monitoring a plurality of use variables of the plurality of handheld wireless devices detected in step (d) and creating or communicating via the communication link based on the use variables when none of the plurality of handheld wireless devices detected in step (d) belongs to the preferred group.

5. The method of claim 1, further comprising the steps of presenting an identity for each of the plurality of handheld wireless devices detected in step (d) on a visual display and receiving from a vehicle occupant a selection placing one or more of the wireless devices in the preferred group.

6. The method of claim 5, further comprising the step of prompting the vehicle occupant to assign relative preferences to the handheld wireless devices in the preferred group.

7. The method of claim 5, further comprising the step of prompting the vehicle occupant to assign relative preferences to two or more short-range wireless protocols.

8. The method of claim 1, further comprising the step of determining that none of the plurality of handheld wireless devices detected in step (d) belongs to the preferred group of wireless devices and creating the communication link between one of the detected handheld wireless devices and the vehicle telematics unit.

9. A method of managing handheld wireless devices at a vehicle, comprising the steps of:
   (a) detecting a plurality of handheld wireless devices at the vehicle using a short-range wireless communication protocol, wherein detecting includes receiving, at the vehicle, information broadcasted from the plurality of handheld wireless devices during a wireless device discoverable mode;
   (b) storing, at least temporarily, at the vehicle, at least some of the information broadcasted from the plurality of handheld wireless devices, the stored information including an identity for each detected handheld wireless device;

(c) presenting the identity for each detected handheld wireless device on a visual display in the vehicle;

(d) receiving a selection from a vehicle occupant that places one or more of the presented identities in a preferred group; and (e) creating a short-range wireless link between a handheld wireless device from the preferred group and a vehicle telematics unit or other vehicle system module.

10. The method of claim 9, further comprising the steps of monitoring a plurality of use variables of the plurality of handheld wireless devices and creating a short-range wireless link based on the use variables when none of the plurality of handheld wireless devices belongs to the preferred group.

11. The method of claim 9, further comprising the step of prompting the vehicle occupant to assign relative preferences to the handheld wireless devices in the preferred group.

12. The method of claim 9, further comprising the step of prompting the vehicle occupant to assign relative preferences to two or more short-range wireless protocols.

13. The method of claim 9, further comprising the step of determining that none of the plurality of handheld wireless devices belongs to the preferred group of handheld wireless devices and creating a short-range wireless link between one of the detected handheld wireless devices and the vehicle telematics unit.

14. A method of managing handheld wireless devices at a vehicle, comprising the steps of:

(a) receiving, at the vehicle, information broadcasted from a handheld wireless device during a wireless device discoverable mode;

(b) storing, at the vehicle, at least some of the information broadcasted from the handheld wireless device, the stored information including an identity of the handheld wireless device;

(c) associating the identity of the handheld wireless device with a preferred group of wireless devices;

(d) detecting a plurality of handheld wireless devices at the vehicle using a short-range wireless communication protocol;

(e) determining whether one or more of the detected handheld wireless devices
 detected in step (d) are associated with the preferred group;

(f) when at least one of the plurality of handheld wireless devices detected in step (d) is determined to belong to the preferred group of wireless devices in step (e), establishing a short-range wireless connection between the handheld wireless device belonging to the preferred group and a vehicle telematics unit to the exclusion of detected handheld wireless devices not associated with the preferred group; and (g) when none of the plurality of handheld devices detected in step (d) is determined to belong to the preferred group of wireless devices in step (e), establishing a short-range wireless connection between a detected handheld wireless device of a vehicle occupant not associated with the preferred group.

15. The method of claim 14, further comprising the steps of monitoring a plurality of use variables of the plurality of handheld wireless devices and creating a short-range wireless link based on the use variables when none of the plurality of wireless devices handheld belongs to the preferred group.

* * * * *